March 9, 1965  H. HORNSCHUCH  3,172,257
HOT GAS POWER PLANT ARRANGEMENT
Filed Aug. 30, 1962  4 Sheets-Sheet 1
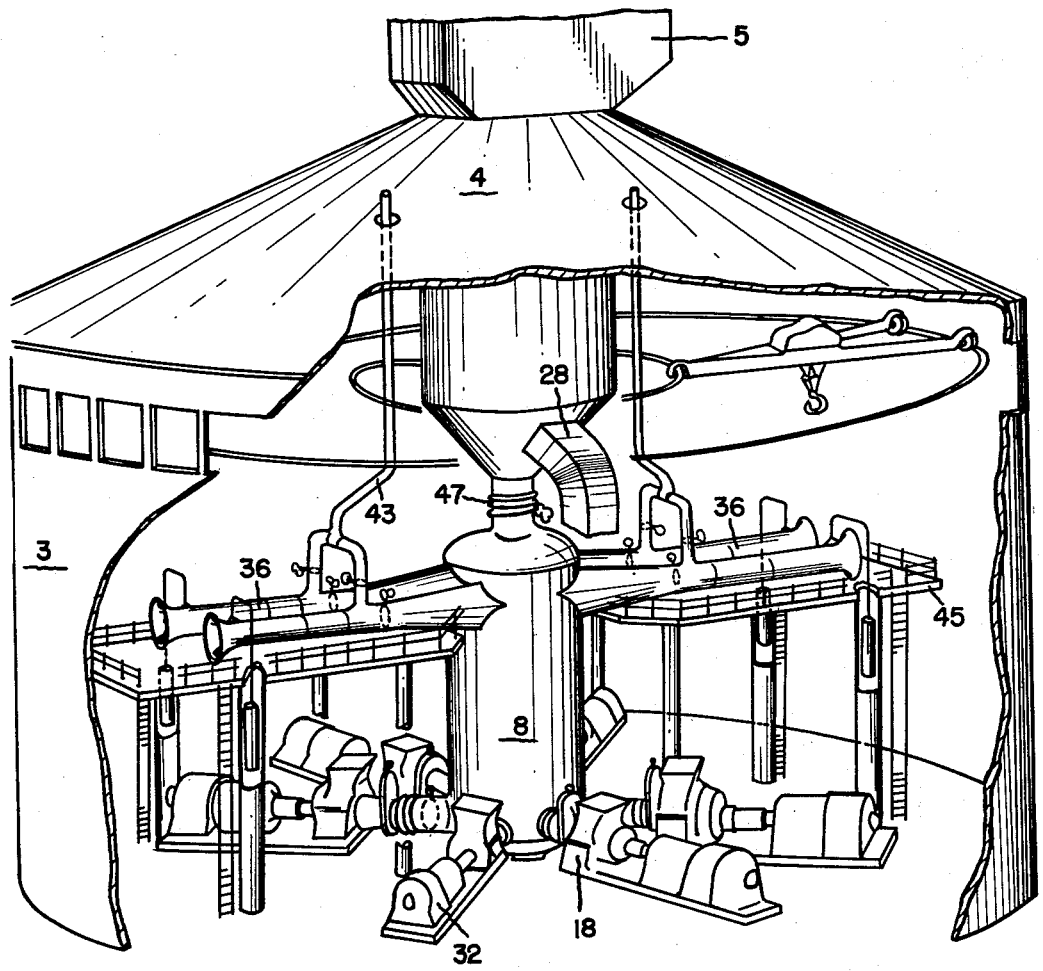
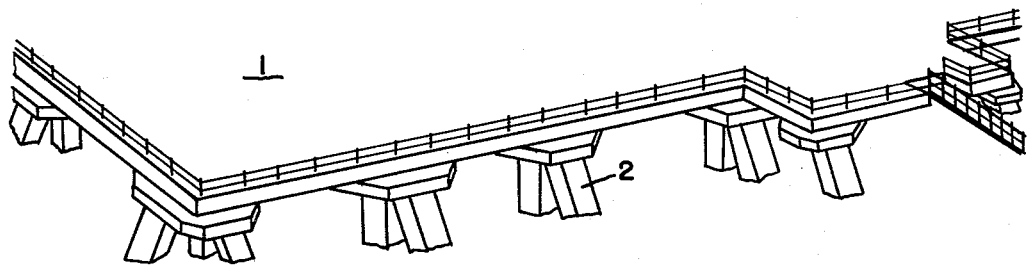
FIG. 1
INVENTOR.
HANNS HORNSCHUCH
BY
ATTORNEY

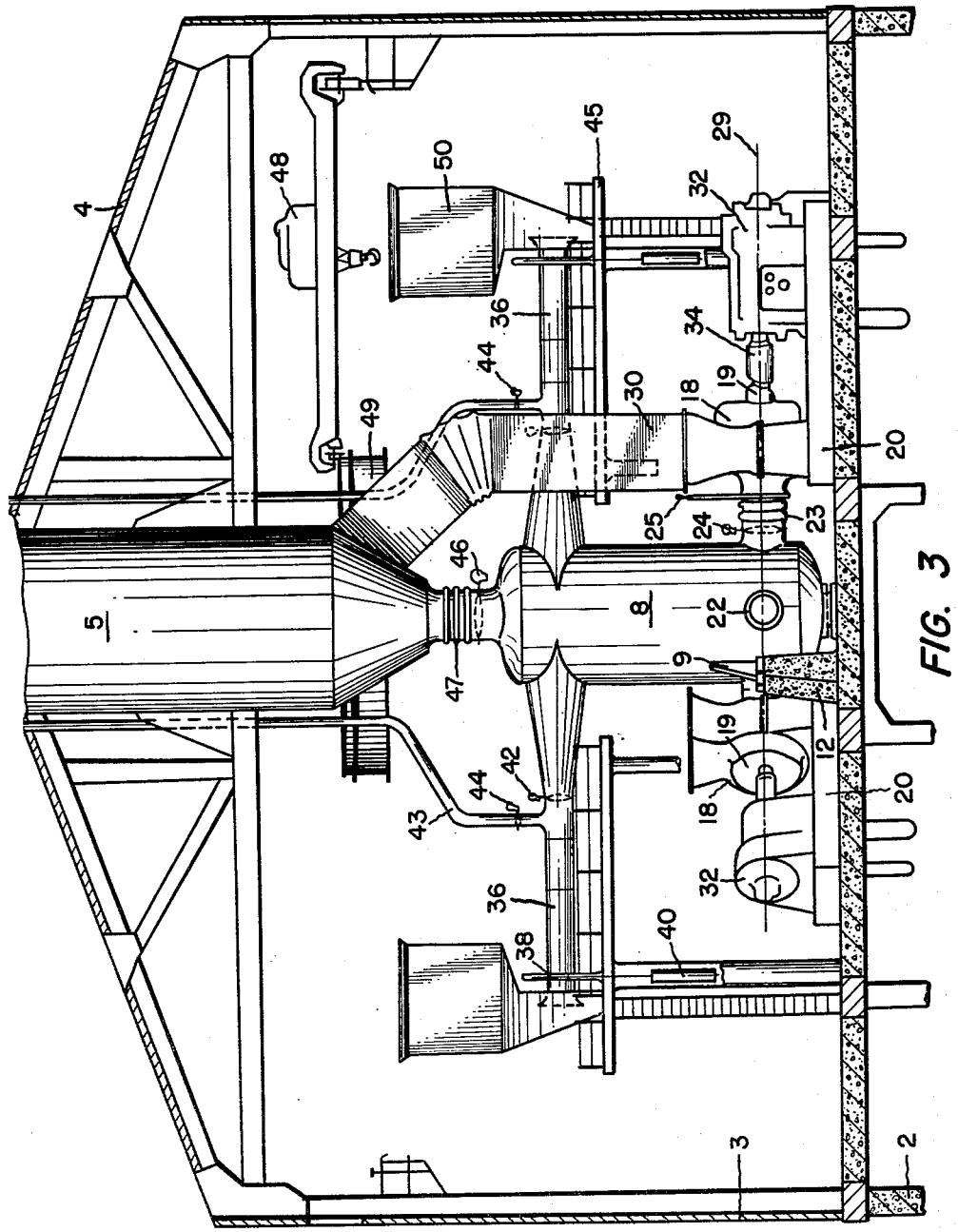

March 9, 1965  H. HORNSCHUCH  3,172,257
HOT GAS POWER PLANT ARRANGEMENT
Filed Aug. 30, 1962  4 Sheets-Sheet 4

INVENTOR.
HANNS HORNSCHUCH
BY
David W. Tibbott
ATTORNEY

United States Patent Office 3,172,257
Patented Mar. 9, 1965

3,172,257
HOT GAS POWER PLANT ARRANGEMENT
Hanns Hornschuch, Easton, Pa., assignor to Ingersoll-Rand Company, New York, N.Y., a corporation of New Jersey
Filed Aug. 30, 1962, Ser. No. 220,525
11 Claims. (Cl. 60—39.15)

This invention relates to large power plant arrangements containing multiple power units driven by heated gas and delivering mechanical power.

Large power plants usually contain one or more hot gas generators, several power units, and a maze of complicated piping, valves, and expansion joints for selectively conducting heated gas from any one or all of the gas generators to any one or all of the power units. Generally, the power units outnumber the gas generators.

Conventional large power plant arrangements have many undesirable features which have heretofore been considered to be necessary evils in the construction of power plants. These disadvantages include the following: they require large amounts of floor space or area to mount and support the various power plant elements; they require expensive and cumbersome piping arrangements; they have numerous thermal expansion problems; and they are extremely expensive to construct, maintain and operate.

The large floor space requirements of conventional power plants become much more objectional when a plant is constructd in a location where the floor space is limited or very expensive. For example, in recent years, the oil industry operating oil wells in Lake Maracaibo, Venezuela, has constructed large power plants on platforms resting on stilts or piles in the water for the purpose of receiving the gas escaping from oil wells with the oil, repressurizing that gas and pumping it back into the oil wells. Heretofore, such power plant platforms have used conventional power plant arrangements, and, as a result, have been very large, about the size of a football field, and very expensive to build and maintain.

The principal object of this invention is to eliminate or substantially minimize the above objections.

Further important objects of this invention include: to provide a large power plant arrangement which is relatively compact, uncomplicated and particularly adapted for use in locations where the floor space is limited; to provide a power plant arrangement which is relatively economical to construct and maintain; to provide a power plant arrangement having a minimum of hot gas piping and expansion joints; to provide a power plant arrangement having minimum thermal expansion problems; to provide a power plant arrangement utilizing conventional airplane jet engines for gas generators; and to provide a power plant having a novel mounting arrangement for its gas generators whereby the gas generators are free to expand without creating thermal expansion loads on the piping and without using expansion joints between the gas generators and the piping.

Briefly, the above objects are attained by locating the power units radially around a vertical cylindrical container or tank which is interconnected to the gas inlets of the power units by short radial pipes having expansion joints and mounting the outlets of the gas generators on the circumference of the tank by a connection which supports the gas generators in a cantilever manner whereby they are substantially free to expand radially outward. Usually, the gas generators are mounted above the power units so that they do not interfere with each other. Many thermal expansion problems are solved by fixing the vertical tank at its vertical axis in a horizontal plane so that it can expand equally in all radial directions and fixing it in a vertical plane extending through the center line of the power units so that it can expand in both vertical directions from the power unit center line.

The invention is illustrated in the accompanying drawings wherein:

FIG. 1 is a perspective view of a power plant constructed according to this invention with portions of the enclosing building and the apparatus being cut away to illustrate the power plant arrangement, this power plant being supported on piles set in a body of water and being used for repressurizing oil well gas and returning the gas to the oil well;

FIG. 3 is a vertical section of the building with most of the power plant apparatus being shown in elevation;

Figure 2:
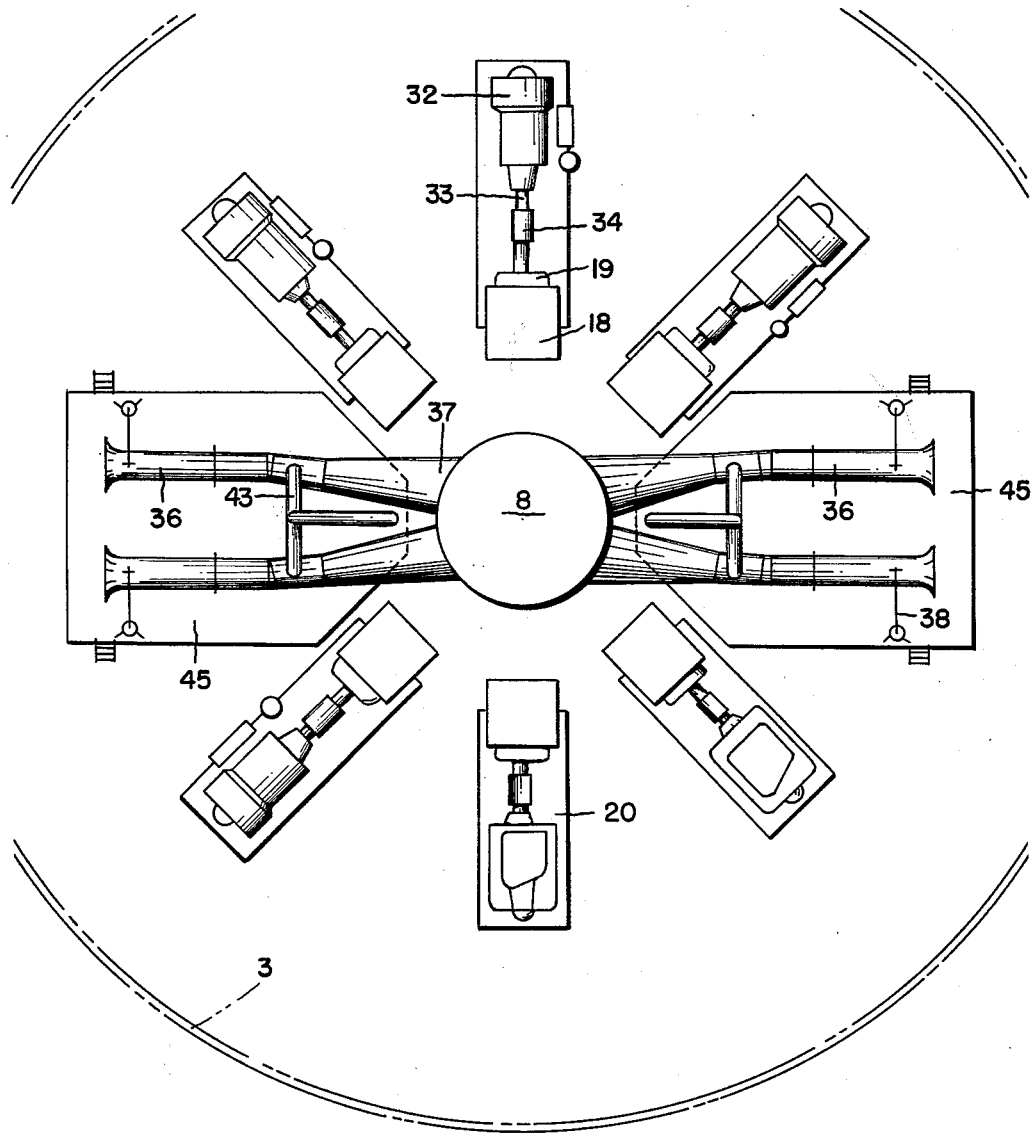
FIG. 2 is a simplified top plan view of the power plant of FIG. 1 with the building and many other parts being omitted to illustrate the novel power plant arrangement.

The embodiment of power plant shown in the drawings rests on a platform 1 supported on pilings 2 set in a body of water and is used for recompressing natural gas escaping from an oil well and pumping that gas back into the oil well. A cylindrical building 3 having a roof 4 rests on the platform 1 and closes the power plant to protect it from the weather. A chimney or exhaust stack 5 projects upwardly from the center of the roof 4.

Figure 4:
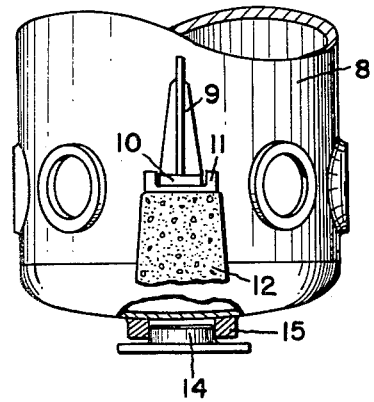
FIG. 4 is an enlarged fragmentary elevation of the bottom portion of the central tank with portions cut away to show the manner of supporting the tank.
Figure 5:
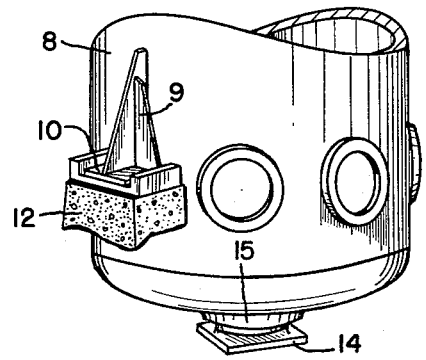
FIG. 5 is a perspective view of the portion of the tank shown in FIG. 4.

The power plant includes a cylindrical tank 8 mounted in the center of the building 3 with its axis extending vertically. A plurality of L-shaped brackets 9 are welded to the circumferential sides of the tank 8 a short distance above its lower end and have horizontal feet 10 extending radially outward from the tank. The feet 10 slidably rest in channel-shaped seats 11 supported on the tops of upwardly projecting pedestals 12 resting on the platform 1 so that the feet 10 can slide back and forth on the seats 11 as the tank 8 expands or contracts under thermal changes. The vertical axis of the tank 8 is fixed relative to a horizontal plane by means of an upright stud 14, shown in FIG. 4, secured to the platform under the center axis of the tank and slidably received in a downwardly opening socket 15 attached to the bottom of the tank 8. The socket 15 is free on the stud 14 to move up or down as the tank 8 changes size under temperature changes.

A plurality of gas expanding turbines 18 are mounted at concentric points surrounding the tank 8 with the shafts 19 of the turbines 18 extending radially outward relative to the tank 8 and located in a common horizontal plane. The turbines 18 are rigidly secured to a bed plate 20. The gas inlets 21 of the turbines 18 open toward the tank 8 along the axes of the turbines and are connected to the tank by short horizontal pipes 22, shown in FIG. 6, containing an expansion joint 23 and a shut-off butterfly valve 24. The expansion joints 23 accommodate thermal changes in the sizes of the tank 8 and the pipes 22 without applying loads or stresses to the turbines 18.

Figure 6:
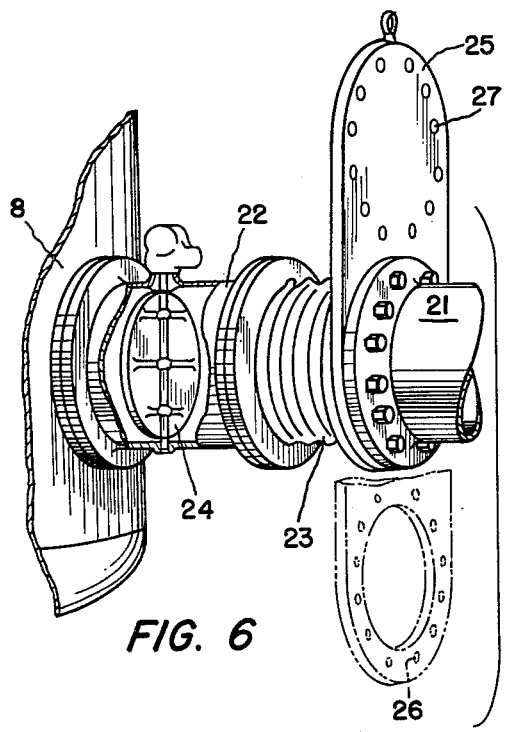
FIG. 6 is an enlarged fragmentary perspective view of the connection between the tank and the power turbines.

FIG. 6 also shows an elongated plate 25 interposed in the bolted joint between the gas inlet 21 and the expansion joint 23 and having a pair of bolt hole rings. The bolt hole ring 26 surrounding an opening is the ring which is used when the turbines 18 are operating. The other ring 27 surrounding an imperforate portion of the plate 25 is used between the joint 23 and inlet 21 when the turbine 18 is being repaired. The plate 25 is necessary since the butterfly valve 24 is incapable of providing a perfect seal between the tank 8 and the turbine 18, although it is fully adequate for control purposes.

The shafts 19 of the turbines 18 lie in a common horizontal plane denoted by the reference number 29 in FIG. 3, which passes through the lower face of the support feet 10 of the tank 8 so that vertical changes in the size of the tank 8 caused by thermal changes do not move or apply loads to the pipes 22. In other words, the tank 8 can expand in both vertical directions away from the axes of the pipes 22; thus the pipes can remain stationary while the other portions of the tank 8 are free to move up and down. Each turbine 18 is connected to an exhaust conduit 30 running upwardly into the central exhaust stack 5, projecting through the roof of the building 3, as shown on FIG. 3. It should be understood that some of the exhaust conduits 30 are omitted from the drawings for the purpose of clarity.

Each turbine 18 drives a centrifugal compressor 32 mounted on its bed plate 20 on the other end of the turbine 18 from the tank 8. The compressor shaft 33 is connected to the turbine shaft 19 by a driving connection 34 which allows the shafts to move axially relative to each other. Each compressor 32 is connected to conventional inlet and outlet pipes which do not form any part of this invention.

Figure 7:
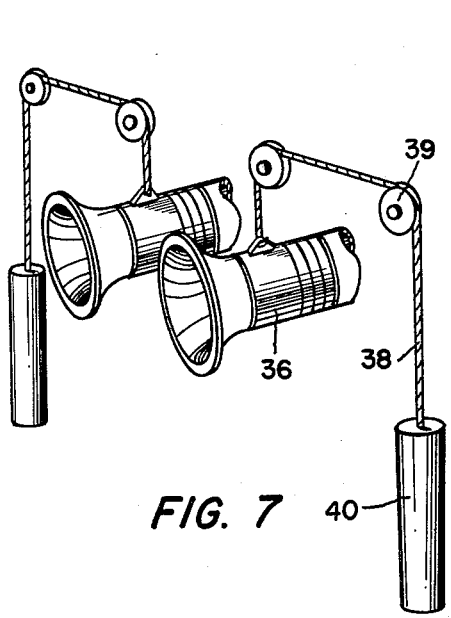
FIG. 7 is an enlarged fragmentary view of the counterbalance arrangement for supporting the outboard ends of the gas generators.

A plurality of conventional aircraft jet engines 36 are mounted on a level above the turbines 18 with their outlet ends rigidly secured to conical diffuser pipes 37 attached to the circumferential sides of the tank 8. Each jet engine 36 is supported adjacent its outer end by a counterbalance system including a flexible cable 38 supported on a pair of pulleys 39, as shown in FIG. 7, and a depending weight 40 secured to the other end of the cable 38. With this supporting arrangement, the jet engine 36 is free to move radially with the thermal changes of the tank 8 and itself and is also free to move up and down with the tank 8. The pulleys 39 are mounted on supporting structure located near each jet engine 36. The radial conical pipe 37, in effect, supports the engine 36 in a cantilever manner.

The conical diffuser pipe 37 contains a shut-off butterfly valve 42 and is connected to an exhaust conduit 43 ahead of the valve 42 so that the jet engine can be ducted out the exhaust conduit 43, when desirable for test purposes, without feeding the tank 8. The exhaust conduit 43 also contains a shut-off butterfly valve 44 for closing the exhaust conduit when the engine 36 is feeding hot gas to the tank 8. Each exhaust conduit 43 extends through the building roof 4, separate from the central chimney 5. Each jet engine 36 is supported immediately over a balcony 45 which may be used by workmen repairing or adjusting the jet engine. The support for the pulleys 39 may be mounted on this balcony 45.

The top of the tank 8 is connected to the center chimney 5 by a valve 46 and an expansion joint 47 for exhausting the tank 8 to atmosphere, when desirable. FIGS. 1 and 3 illustrate a crane 48 mounted on circular track 49 supported by the building above the power plant apparatus for use when repairing or otherwise working on the power plant. FIG. 3 also shows intake funnels 50 mounted on the balcony 45 to protect workmen from being sucked into the jet engines 36.

It should be noted that the foregoing arrangement eliminates substantially all of the gas piping between the turbines 18 and the jet engines 36, and, as a result, minimizes the thermal expansion problems of the power plant. As the apparatus heats up, the tank 8 is free to expand radially in all directions and axially in both directions from the horizontal center line 29 of the turbines 18. The jet engines 36 are free to expand outwardly and also to move up with the expansion of the tank 8. The counterbalance cable 38 supports the outboard end of the engines 36 while leaving them free to move vertically and horizontally. The various butterfly valves 24, 42, 44, and 46 can be manipulated to selectively operate any of the various jet engines 36 and the turbines 18, thus providing complete freedom of control over the power plant. Finally, one very important advantage offered by this arrangement is that it is very compact, and, thus, can be supported on a much smaller area than prior plants of equivalent capacity. Obviously, this compactness becomes very important when the plant is constructed on a platform in a body of water (the platform for a conventional power plant costs at least as much as the plant itself).

It will be understood that although only one embodiment of the invention is specifically described, the invention may embrace various other embodiments which are obvious from an understanding of the described embodiment and are embraced within the claims of the invention. For example, the power plant might have a semi-circular arrangement, as seen in plan view, rather than a full circular arrangement. Another modification might have the jet engines or gas generators 36 mounted below the gas turbines 18, instead of above them as in the described embodiment.

Having described my invention, I claim:

1. A power plant comprising:
    (a) a tank adapted to contain hot gas;
    (b) a plurality of power units adapted to operate on hot gas and located radially around said tank relatively near it;
    (c) each of said power units having its gas inlet connected to said tank by a pipe extending radially from said tank and including a yieldable joint for accommodating thermal expansion of the tank, pipe and power unit; and
    (d) at least one jet engine supported on said tank with its gas outlet connected to said tank for feeding hot gas into said tank where it may flow to said power units.

2. A power plant comprising:
    (a) a tank adapted to contain hot gas;
    (b) a plurality of power units adapted to operate on hot gas and located radially around said tank relatively near it;
    (c) said tank being supported along a horizontal plane passing through the center line of each of said power units whereby said tank is free to expand thermally in both vertical directions away from said horizontal plane without applying a thermal load to said power units;
    (d) each of said power units having its gas inlet connected to said tank by a pipe extending radially from said tank and including a yieldable joint for accommodating thermal expansion of the tank, pipe and power unit; and
    (e) at least one gas generator having its gas outlet connected to said tank for feeding hot gas into said tank where it may flow to said power units.

3. The power plant of claim 2 wherein:
    (a) said pipes interconnecting said tank and power units have their axes located in said horizontal plane.

4. A power plant comprising:
    (a) a tank adapted to contain hot gas;
    (b) a plurality of power units adapted to operate on hot gas and located radially around said tank relatively near it;
    (c) each of said power units having its gas inlet connected to said tank by a pipe extending radially from said tank and including a yieldable joint for accommodating thermal expansion of the tank, pipe and power unit; and
    (d) at least one gas generator having its gas outlet connected to said tank for feeding hot gas into said tank where it may flow to said power units;
    (e) said gas generator being supported substantially on said tank and being free to move bodily with the expansion of said tank and to expand relative to said tank without creating additional stresses within either the tank or the gas generator.

5. The power plant of claim 4 wherein:
(a) the outer portion of said gas generator is supported on a yieldable connection allowing it to move freely in both a radial direction and a vertical direction with the thermal movements of the tank and the gas generator.

6. The power plant of claim 5 wherein:
(a) said gas generator is a jet engine designed for use in aircraft.

7. The power plant of claim 5 wherein:
(a) said yieldable connection includes a counterbalance system for supporting the outboard end of said gas generator while leaving it free to move in a vertical direction.

8. The power plant of claim 1 wherein:
(a) said tank is anchored along its vertical axis by a means leaving the tank free to expand in either vertical direction from the pipes connecting the tank to said power units.

9. A power plant comprising:
(a) a tank adapted to contain hot gas;
(b) a plurality of power units adapted to operate on hot gas and located radially around said tank relatively near it;
(c) each of said power units having its gas inlet connected to said tank by a pipe extending radially from said tank and including a yieldable joint for accommodating thermal expansion of the tank, pipe and power unit;
(d) a first jet engine supported on said tank with its gas outlet connected to said tank for feeding hot gas into said tank where it may flow to said power units; and
(e) a second jet engine supported on said tank and having its outlet connected to said tank in the same manner as the first engine is mounted.

10. The power plant of claim 9 including:
(a) individual means mounted on the outlet of each jet engine wherein each jet engine can be selectively isolated from the gas discharged into the tank by the other jet engine.

11. A power plant comprising:
(a) a tank adapted to contain hot gas;
(b) a plurality of power units adapted to operate on hot gas;
(c) each of said power units having its gas inlet connected to said tank by a separate pipe to receive hot gas from said tank; and
(d) a plurality of jet engines having their outlets connected to said tank to discharge hot gas into said tank and being individually supported on said tank so that they are free to move bodily with said tank during thermal changes in size of the tank.

References Cited by the Examiner
UNITED STATES PATENTS

| | | | |
|---|---|---|---|
| 1,024,079 | 4/12 | Jennings | 60—39.68 |
| 2,481,547 | 9/49 | Walker et al. | 60—35.6 |
| 2,522,118 | 9/50 | Kadenacy | 60—39.68 |
| 2,564,042 | 8/51 | Walker | 60—35.6 |
| 2,580,207 | 12/51 | Whittle | 60—35.6 |
| 2,622,392 | 12/52 | Boestad et al. | 60—39.15 |
| 2,665,058 | 1/54 | Kantrowitz | 60—39.32 |
| 2,787,124 | 4/57 | Donahue | 60—39.32 |

FOREIGN PATENTS 342,820   6/04   France.

SAMUEL LEVINE, *Primary Examiner.*
ABRAM BLUM, *Examiner.*